(12) United States Patent
Yoshihara

(10) Patent No.: US 10,547,989 B2
(45) Date of Patent: Jan. 28, 2020

(54) TERMINAL, VEHICLE CONTROL SYSTEM, AND VEHICLE CONTROL METHOD

(71) Applicant: TOYOTA JIDOSHA KABUSHIKI KAISHA, Toyota-shi, Aichi-ken (JP)

(72) Inventor: Toru Yoshihara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/052,983

(22) Filed: Aug. 2, 2018

(65) Prior Publication Data

US 2019/0098472 A1    Mar. 28, 2019

(30) Foreign Application Priority Data

Sep. 27, 2017  (JP) ................................ 2017-186791

(51) Int. Cl.
  *H04W 4/48* (2018.01)
  *H04M 1/725* (2006.01)

(52) U.S. Cl.
  CPC ......... *H04W 4/48* (2018.02); *H04M 1/72577* (2013.01)

(58) Field of Classification Search
  CPC ...... G07C 2009/00984; G07C 9/00182; G07C 2009/00769; G07C 2009/00365; G07C 9/00658; G07C 2009/00198; G07C 2009/0038; G07C 2009/00547; G07C 9/00007; G07C 2009/00261; B60R 25/209; G08G 1/096725; H02J 50/20; H02J 50/80; H04W 4/44; H04W 4/38; H04W 76/40; E05B 19/0082
  See application file for complete search history.

(56) References Cited

U.S. PATENT DOCUMENTS

| 9,842,447 B2* | 12/2017 | Badger, II ............. B60R 25/102 |
| 9,842,448 B1* | 12/2017 | Lickfelt ............. G07C 9/00896 |
| 2009/0002147 A1* | 1/2009 | Bloebaum ........... H04M 1/6075 340/466 |
| 2013/0053075 A1 | 2/2013 | Yoshizawa et al. |

(Continued)

FOREIGN PATENT DOCUMENTS

| DE | 19937915 A1 | 3/2000 |
| DE | 102011013605 A1 | 9/2012 |
| FR | 2834344 A1 | 7/2003 |

(Continued)

*Primary Examiner* — Nizar N Sivji
(74) *Attorney, Agent, or Firm* — Oliff PLC

(57) ABSTRACT

A terminal performs communication with an in-vehicle device to control a vehicle. The terminal includes a controller configured to switch and control an operation mode of the terminal to at least a predetermined first mode or a predetermined second mode, a reception unit configured to receive a first signal including a switching request of the operation mode from the in-vehicle device, a generation unit configured to update a predetermined value with the reception of the first signal and generate a second signal based on the updated predetermined value, and a transmission unit configured to transmit the second signal to the in-vehicle device. When a third signal including a command for instructing switching of the operation mode received by the reception unit is a response to the second signal, the controller switches the operation mode from the first to the second mode or from the second to the first mode.

14 Claims, 5 Drawing Sheets

(56) References Cited

U.S. PATENT DOCUMENTS

2015/0127210 A1* 5/2015 Suzuki .................. B60K 35/00
701/29.1

FOREIGN PATENT DOCUMENTS

| | | | |
|---|---|---|---|
| JP | H09-004292 A | | 1/1997 |
| JP | 2009-031853 A | | 2/2009 |
| JP | 2010-124376 A | | 6/2010 |
| JP | 2010124376 A | * | 6/2010 |
| JP | 2012-009986 A | | 1/2012 |
| JP | 2012-144906 A | | 8/2012 |
| JP | 5365979 B2 | | 12/2013 |
| KR | 10-2016-0073644 A | | 6/2016 |

* cited by examiner

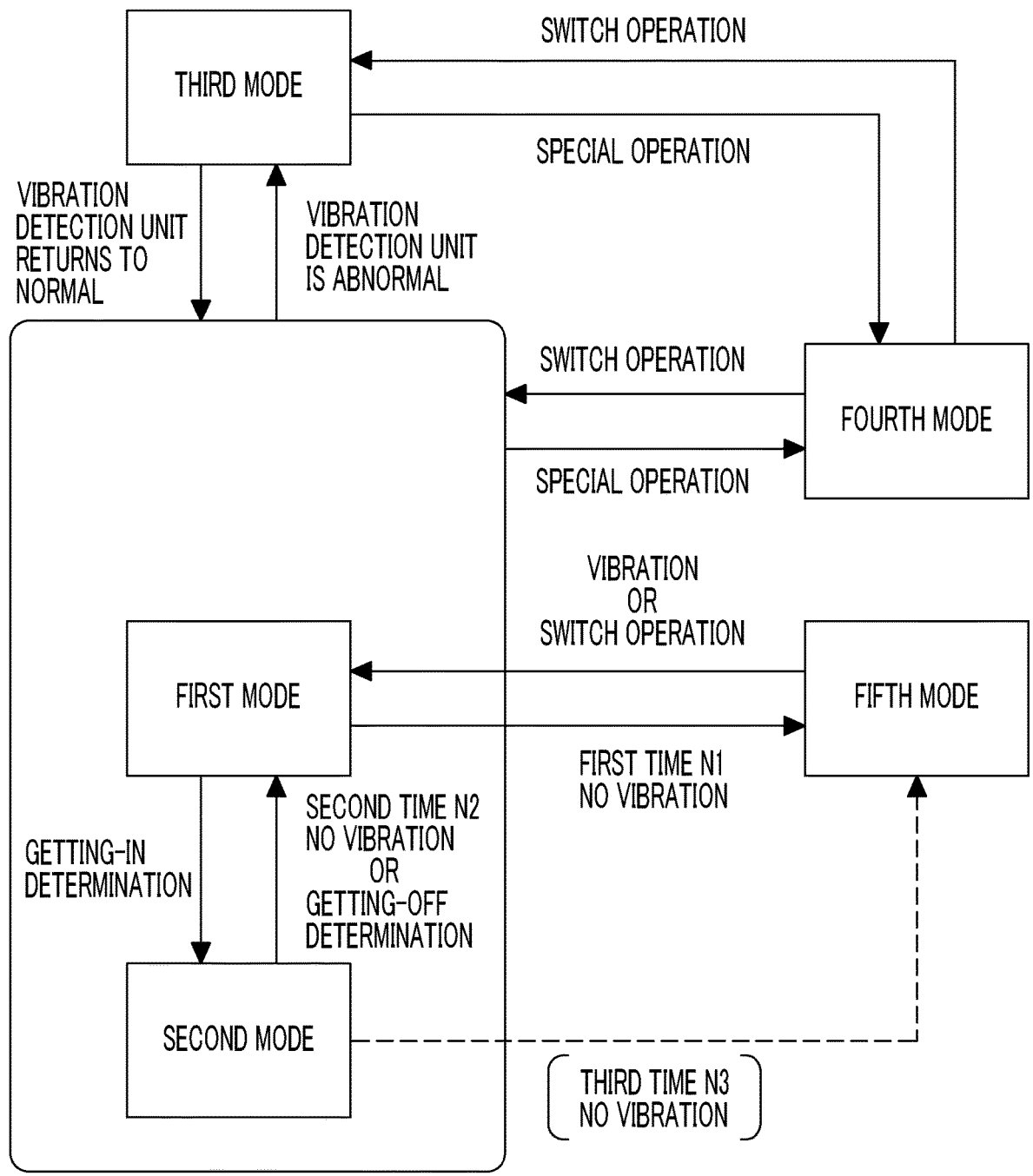

TERMINAL, VEHICLE CONTROL SYSTEM, AND VEHICLE CONTROL METHOD

INCORPORATION BY REFERENCE

The disclosure of Japanese Patent Application No. 2017-186791 filed on Sep. 27, 2017 including the specification, drawings and abstract is incorporated herein by reference in its entirety.

BACKGROUND

1. Technical Field

The present disclosure relates to a terminal (hereinafter, referred to as a "terminal") that performs communication with an in-vehicle device to control a vehicle, a vehicle control system including the terminal and the in-vehicle device, and a vehicle control method that the vehicle control system executes.

2. Description of Related Art

For example, Japanese Unexamined Patent Application Publication No. 9-004292 (JP 9-004292 A) and Japanese Unexamined Patent Application Publication No. 2012-144906 (JP 2012-144906 A) disclose a system in which permission of a vehicle operation or switching of an operation mode of an electronic key is performed based on whether or not the electronic key vibrates, thereby achieving improvement of security or convenience.

SUMMARY

In the techniques described in JP 9-004292 A and JP 2012-144906 A, in a case where a command for instructing permission of a vehicle operation or switching of an operation mode of a terminal, such as an electronic key, is copied to a third party in the middle of communication, and the copied command is used for an instruction as it is, permission of a vehicle operation or switching of the operation mode of the terminal, such as an electronic key, may be performed at a timing unintended by a user.

The disclosure provides a terminal, a vehicle control system, and a vehicle control method capable of further suppressing switching of an operation mode of a terminal, such as an electronic key, at a timing unintended by a user.

A first aspect of the disclosure relates to a terminal that performs communication with an in-vehicle device to control a vehicle. The terminal includes a controller, a reception unit, a generation unit, and a transmission unit. The controller is configured to switch and control an operation mode of the terminal to at least a predetermined first mode or a predetermined second mode. The reception unit is configured to receive a first signal including a switching request of the operation mode of the terminal from the in-vehicle device. The generation unit is configured to update a predetermined value with the reception of the first signal and generate a second signal based on the updated predetermined value. The transmission unit is configured to transmit the second signal to the in-vehicle device. In a case where a third signal including a command for instructing switching of the operation mode of the terminal received by the reception unit is a response to the second signal, the controller is configured to switch the operation mode of the terminal from the predetermined first mode to the predetermined second mode or from the predetermined second mode to the predetermined first mode.

In the terminal according to the first aspect of the disclosure, in a case where the first signal including the switching request of the operation mode of the terminal is received from the in-vehicle device, the second signal based on the predetermined value updated with the reception of the first signal is generated and transmitted to the in-vehicle device. In a case where the third signal including the command for instructing switching of the operation mode of the terminal generated based on the predetermined value from the terminal can be received as the response of the second signal from the in-vehicle device, the operation mode of the terminal is switched.

With the above-described control, even though the third signal including the command for instructing switching of the mode of the terminal is copied by a third party, in a case where the third signal is used in an unauthorized manner when one communication sequence or more has elapsed after the third signal is copied, determination is made that the third signal is not a response to the second signal transmitted before the third signal is received. Accordingly, it is possible to further suppress switching of the operation mode of the terminal at a timing unintended by a user.

In the terminal according to the first aspect of the disclosure, the predetermined value may be a random number that is generated by the terminal.

In the terminal according to the first aspect of the disclosure, the predetermined value may be reception strength of the first signal.

In the terminal according to the first aspect of the disclosure, the predetermined value may be a communication frequency between the terminal and the in-vehicle device.

In a case where the predetermined value described above is set, it is possible to easily acquire a value that is updated with the reception of the first signal.

The terminal according to the first aspect of the disclosure may further include a vibration detection unit configured to detect vibration of the terminal. The controller may be configured to, in the first mode, restrict communication with the in-vehicle device in a case where vibration is not detected in the vibration detection unit for a predetermined time, and, in the second mode, restrict communication with the in-vehicle device in a case where vibration is not detected in the vibration detection unit for a time longer than the predetermined time.

With the above-described control, even though vibration of the terminal is not detected, the operation mode of the terminal is not switched instantly from the first mode or the second mode to another mode. Accordingly, it is possible to further suppress frequent switching of the operation mode of the terminal in a case where the presence or absence of vibration of the terminal is repeatedly detected in a period shorter than the predetermined time.

In the terminal according to the first aspect of the disclosure, the controller may be configured to, when the first mode or the second mode is executed, in a case where an abnormality occurs in the vibration detection unit, switch the operation mode of the terminal to a third mode as an operation mode where communication with the in-vehicle device is performed, regardless of a result of vibration detection in the vibration detection unit.

In the terminal according to the first aspect of the disclosure, the controller may be configured to, when the operation mode of the terminal is the third mode, i) in a case where the abnormality of the vibration detection unit is eliminated, switch the operation mode of the terminal to the first mode or the second mode, and ii) in a case where a first input operation on the terminal is detected, switch the operation mode of the terminal to a fourth mode as an operation mode where communication with the in-vehicle device is restricted.

In the terminal according to the first aspect of the disclosure, the controller may be configured to, when the fourth mode is executed, solely in a case where a second input operation on the terminal is detected, release the fourth mode.

In the terminal according to the first aspect of the disclosure, the vibration detection unit of the terminal may be configured to detect vibration using an acceleration sensor.

With the above-described control, it is possible to switch the operation mode of the terminal to an optimum mode constantly.

A second aspect of the disclosure relates to a vehicle control method that a terminal configured to perform communication with an in-vehicle device to control a vehicle executes. The vehicle control method includes receiving a first signal including a switching request of an operation mode of the terminal from the in-vehicle device, updating a predetermined value with the reception of the first signal, generating a second signal based on the updated predetermined value, transmitting the second signal to the in-vehicle device, receiving a third signal including a command for instructing switching of the operation mode of the terminal from the in-vehicle device, and in a case where the third signal is a response to the second signal, switching the operation mode of the terminal from a predetermined first mode to a predetermined second mode or from the predetermined second mode to the predetermined first mode.

A third aspect of the disclosure relates to a vehicle control system including an in-vehicle device and a terminal. The in-vehicle device includes a first transmission unit, a first reception unit, a first generation unit, and a second transmission unit. The first transmission unit is configured to, in a case of switching an operation mode of the terminal, transmit a first signal including a switching request of the operation mode of the terminal to the terminal. The first reception unit is configured to receive a second signal as a response to the first signal from the terminal. The first generation unit is configured to generate a third signal including a command for instructing switching of the operation mode of the terminal based on the second signal. The second transmission unit is configured to transmit the third signal to the terminal. The terminal includes a second reception unit, a second generation unit, a third transmission unit, a third reception unit, and a controller. The second reception unit is configured to receive the first signal from the in-vehicle device. The second generation unit is configured to update a predetermined value with the reception of the first signal and generate the second signal based on the updated predetermined value. The third transmission unit is configured to transmit the second signal to the in-vehicle device. The third reception unit is configured to receive the third signal from the in-vehicle device. The controller is configured to, in a case where the third signal is a response to the second signal, switch the operation mode of the terminal from a predetermined first mode to a predetermined second mode or from the predetermined second mode to the predetermined first mode. The in-vehicle device and the terminal perform communication to control a vehicle.

With the control according to the second aspect and the third aspect of the disclosure, even though the third signal copied by a third party is used in an unauthorized manner, determination is also made that the third signal is not a response to the second signal transmitted before the third signal is received. Accordingly, it is possible to further suppress switching of the operation mode of the terminal at a timing unintended by a user.

With the terminal, the vehicle control system, and the vehicle control method according to the aspects of the disclosure, it is possible to further suppress switching of an operation mode of a terminal, such as an electronic key, at a timing unintended by a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 shows an example of a state transition diagram of the terminal in the vehicle control system according to the embodiment.

DETAILED DESCRIPTION OF EMBODIMENTS

Outline

In a vehicle control system including an in-vehicle device and a terminal of the disclosure, in a case where the terminal receives a switching request of an operation mode from the in-vehicle device, a signal based on a predetermined value updated every time is generated and transmitted to the in-vehicle device. The terminal switches the operation mode in a case where an instruction command based on the latest predetermined value can be received as a response to the signal from the in-vehicle device.

Configuration of System

Figure 1:
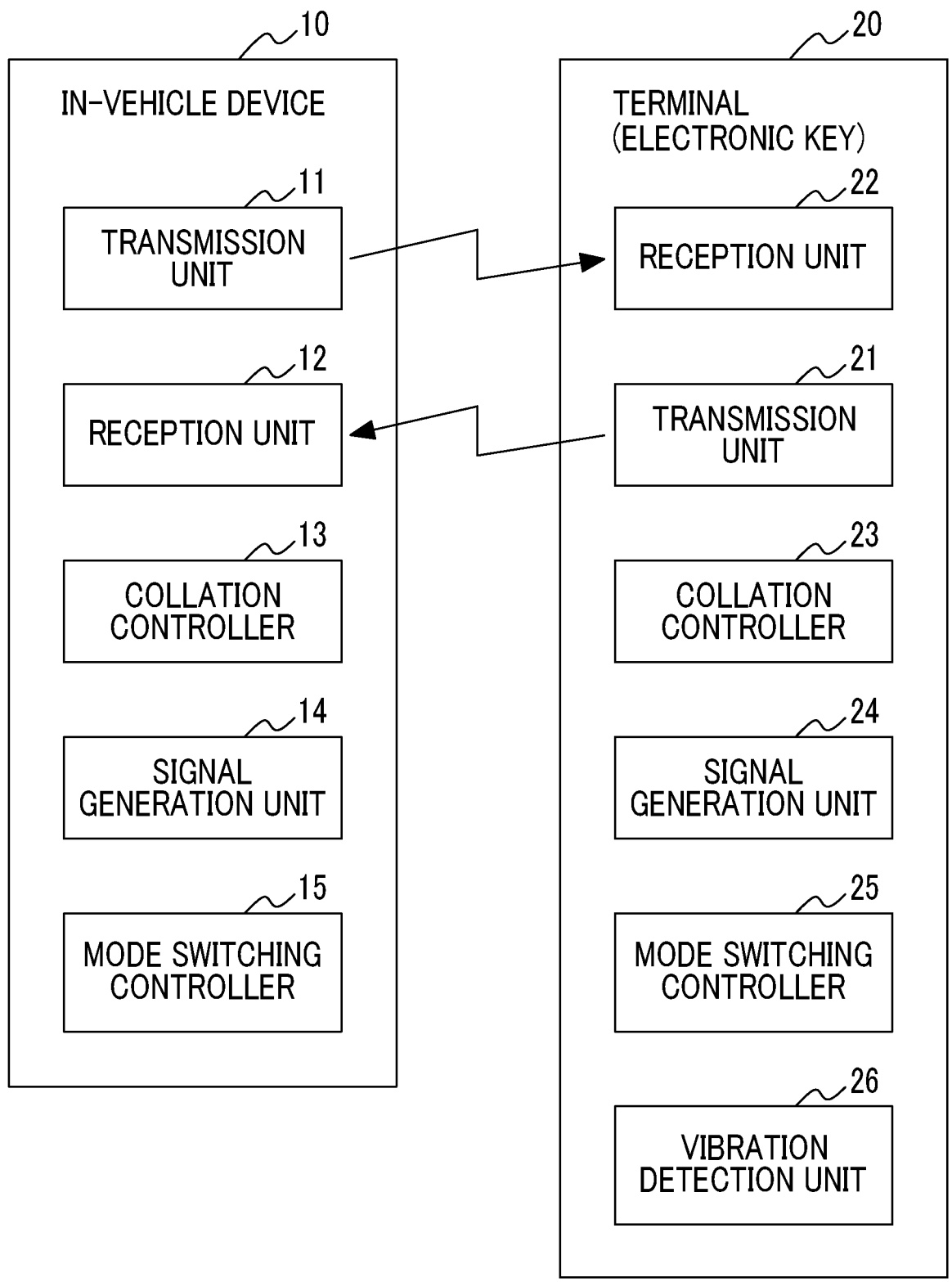
FIG. 1 is a diagram illustrating the schematic configuration of a vehicle control system according to an embodiment.

FIG. 1 is a diagram illustrating the schematic configuration of a vehicle control system 1 according to an embodiment of the disclosure. In FIG. 1, the vehicle control system 1 includes an in-vehicle device 10 that is provided in a vehicle, and a terminal 20 that can be carried with a user or the like.

The vehicle control system 1 performs encryption collation processing through a predetermined communication sequence between the in-vehicle device 10 and the terminal 20 to allow the in-vehicle device 10 to authenticate the terminal 20 and to realize predetermined vehicle control (unlocking or locking of a vehicle door, start of an engine, or the like), or switching of a predetermined operation mode in the terminal 20.

The terminal 20 is a concept including an electronic key dedicated to a vehicle operation, and an electronic apparatus, such as a smartphone, in which predetermined key information downloaded from a server or the like is set. In the following embodiment, the vehicle control system 1 will be described in connection with an example where an electronic key is used as the terminal 20.

In-Vehicle Device

In FIG. 1, the in-vehicle device 10 includes a transmission unit 11, a reception unit 12, a collation controller 13, a signal generation unit 14, and a mode switching controller 15.

The transmission unit 11 can transmit an electric wave signal (hereinafter, referred to as a "Wake signal") for activating an electronic key 20 around the vehicle in a predetermined range through a transmission antenna (not shown). The transmission unit 11 can transmit an electric wave signal (hereinafter, referred to as a "first signal") for confirming whether or not the electronic key 20 that returns an electric wave signal (hereinafter, referred to as an acknowledgement (ACK) signal) as a response to the Wake signal is an authorized electronic key in a predetermined range through the transmission antenna. The transmission unit 11 can transmit an electric wave signal (hereinafter, referred to as a "third signal") based on an electric wave signal (hereinafter, referred to as a "second signal") returned as a response to the first signal in a predetermined range through the transmission antenna. The Wake signal, the first signal, and the third signal can be, for example, low frequency (LF) signals.

The reception unit 12 can receive the ACK signal transmitted from the transmission unit 21 of the electronic key 20 as a response to the Wake signal and the second signal transmitted from the transmission unit 21 of the electronic key 20 as a response to the first signal through a reception antenna (not shown).

The collation controller 13 can perform encryption collation processing for confirming whether or not the electronic key 20 that transmits the second signal is an authorized electronic key. For example, the collation controller 13 can determine whether or not the electronic key 20 that transmits the second signal is an authorized electronic key by comparing and collating a key-specific identifier ID included in the second signal with an identifier ID registered in a storage unit (not shown) of the in-vehicle device 10 in advance. A known technique can be used in the encryption collation processing, and thus, detailed description will not be repeated.

The signal generation unit 14 can generate the first signal for confirming whether or not the electronic key 20 that returns the ACK signal is an authorized electronic key. The first signal can include a switching request of an operation mode of the electronic key 20 according to an instruction of the mode switching controller 15 described below. The signal generation unit 14 can generate the third signal including a command for instructing the electronic key 20 to switch the operation mode based on the second signal received from the electronic key 20.

The mode switching controller 15 determines whether or not a predetermined condition described below is satisfied, and in a case where the predetermined condition is satisfied, instructs the signal generation unit 14 to generate the first signal including a request for appropriately switching the operation mode of the electronic key 20 or the third signal including the command for instructing switching of the operation mode of the electronic key 20.

The whole or a part of the in-vehicle device 10 described above can be constituted as an electronic control unit (ECU) typically including a central processing unit (CPU), a memory, an input/output interface, and the like. In the electronic control unit, the CPU reads and executes a predetermined program stored in the memory, whereby a predetermined function is realized.

Electronic Key

In FIG. 1, the electronic key 20 includes a transmission unit 21, a reception unit 22, a collation controller 23, a signal generation unit 24, and a mode switching controller 25.

The reception unit 22 can receive the Wake signal transmitted from the transmission unit 11 of the in-vehicle device 10, the first signal transmitted from the transmission unit 11 of the in-vehicle device 10 as a response to the ACK signal, and the third signal transmitted from the transmission unit 11 of the in-vehicle device 10 as a response to the second signal through the reception antenna (not shown).

The transmission unit 21 can transmit the ACK signal indicating the activation of the electronic key 20 according to the Wake signal received by the reception unit 22 in a predetermined range through the transmission antenna (not shown). The transmission unit 21 can transmit the second signal generated by the signal generation unit 24 described below as a response to the first signal received by the reception unit 22 in a predetermined range through the transmission antenna. The ACK signal and the second signal can be, for example, radio frequency (RF) signals.

The collation controller 23 can perform encryption collation processing for confirming whether or not the in-vehicle device 10 that transmits the first signal is a device that is mounted in a key-registered vehicle. For example, the collation controller 23 can determine whether or not the in-vehicle device 10 that transmits the first signal is a device that is mounted in the key-registered vehicle by comparing and collating an identifier ID included in the first signal and a key-specific identifier ID registered in a storage unit (not shown) of the electronic key 20 in advance. A known technique can be used in the encryption collation processing, and thus, detailed description will not be repeated.

The collation controller 23 can perform encryption collation processing for confirming whether or not the third signal transmitted from the in-vehicle device 10 is an authorized signal including a predetermined value described below transmitted from the in-vehicle device 10 according to a procedure of a predetermined communication sequence. For example, the collation controller 23 can determine whether or not the third signal is an authorized signal transmitted according to the procedure of the predetermined communication sequence by comparing and collating the predetermined value included in the third signal with a predetermined value stored in the storage unit (not shown) of the electronic key 20. For example, in a case where the third signal is encoded with the predetermined value, collation processing may be performed after the third signal is decoded with the predetermined value.

The signal generation unit 24 can generate the ACK signal as a response to the Wake signal. The signal generation unit 24 can generate the second signal as a response to the first signal. The second signal is generated based on a predetermined value (hereinafter, referred to as a "predetermined value X") that is updated each time the first signal is received in a case where the switching request of the operation mode of the electronic key 20 is included in the first signal.

For the predetermined value X, for example, a random number can be used. For example, in a case where logic means (not shown) for generating a random number is provided in the electronic key 20 in advance, a random number that is generated by the logic means each time the electronic key 20 receives the first signal can be acquired as the predetermined value X.

For the predetermined value X, for example, reception strength (received signal strength indicator (RSSI)) of the first signal received by the electronic key 20 can be used. For example, in a case where a Burst signal (not shown) for RSSI measurement is included in the first signal transmitted from the in-vehicle device 10 in advance, and means (not shown) for measuring reception strength is provided in the electronic key 20 in advance, the reception strength of the Burst signal that is measured each time the electronic key 20 receives the first signal can be acquired as the predetermined value X. In this case, since the above-described logic means for generating a random number does not need to be additionally provided in the electronic key 20, there is no need to increase the capacity of the microcomputer of the electronic key 20.

For the predetermined value X, for example, a communication frequency between the electronic key 20 and the in-vehicle device 10 can be used. For example, counter means (not shown) can be provided in the electronic key 20, and a counter value that is integrated each time the electronic key 20 receives the first signal can be acquired as the predetermined value X.

The second signal may be, for example, in a format of the predetermined value X being attached to a prescribed response signal or in a format of the encoded predetermined value X being attached to the prescribed response signal.

In a case where the collation controller 23 determines that the third signal is an authorized signal transmitted according to the procedure of the predetermined communication sequence, the mode switching controller 25 switches the operation mode of the electronic key 20. The electronic key 20 according to the embodiment has at least a predetermined first mode and a predetermined second mode, and the mode switching controller 25 can switch the operation mode of the electronic key 20 from the first mode to the second mode or from the second mode to the first mode based on the instruction of the third signal.

Control in System

Figure 2:
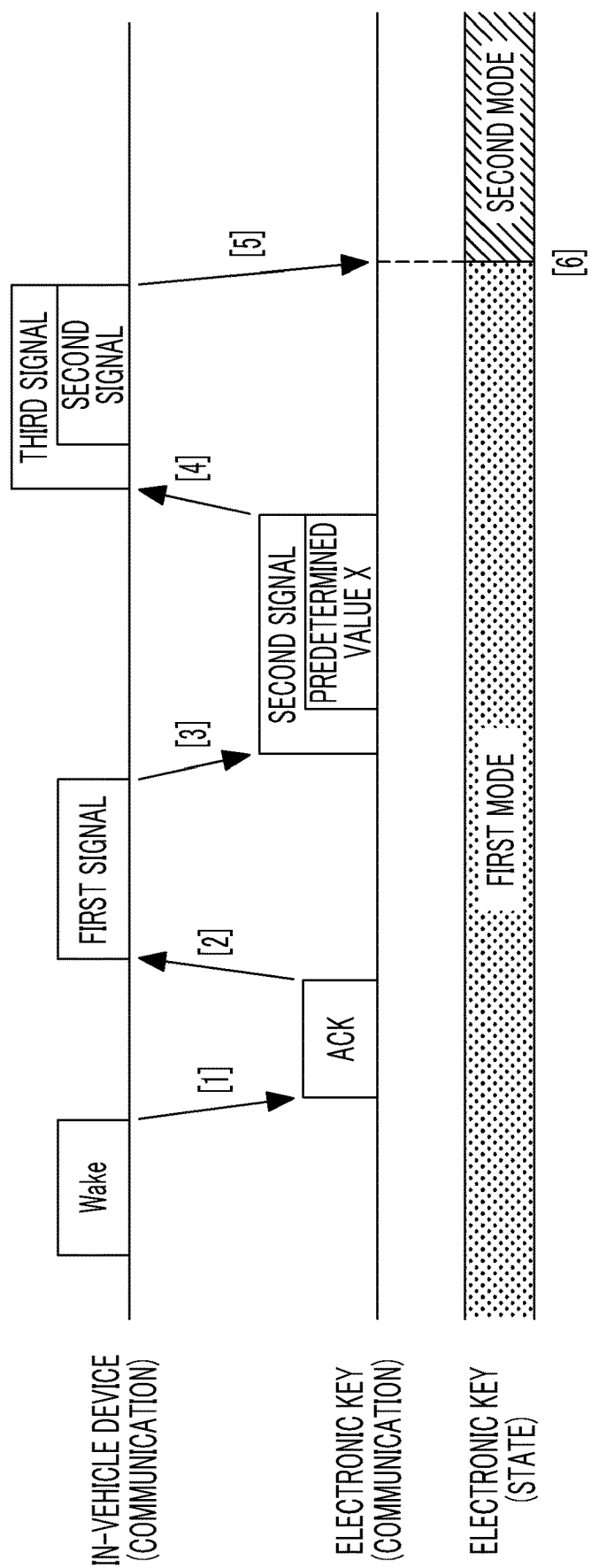
FIG. 2 shows an example of a communication sequence that is executed between an in-vehicle device and a terminal.
Figure 3:
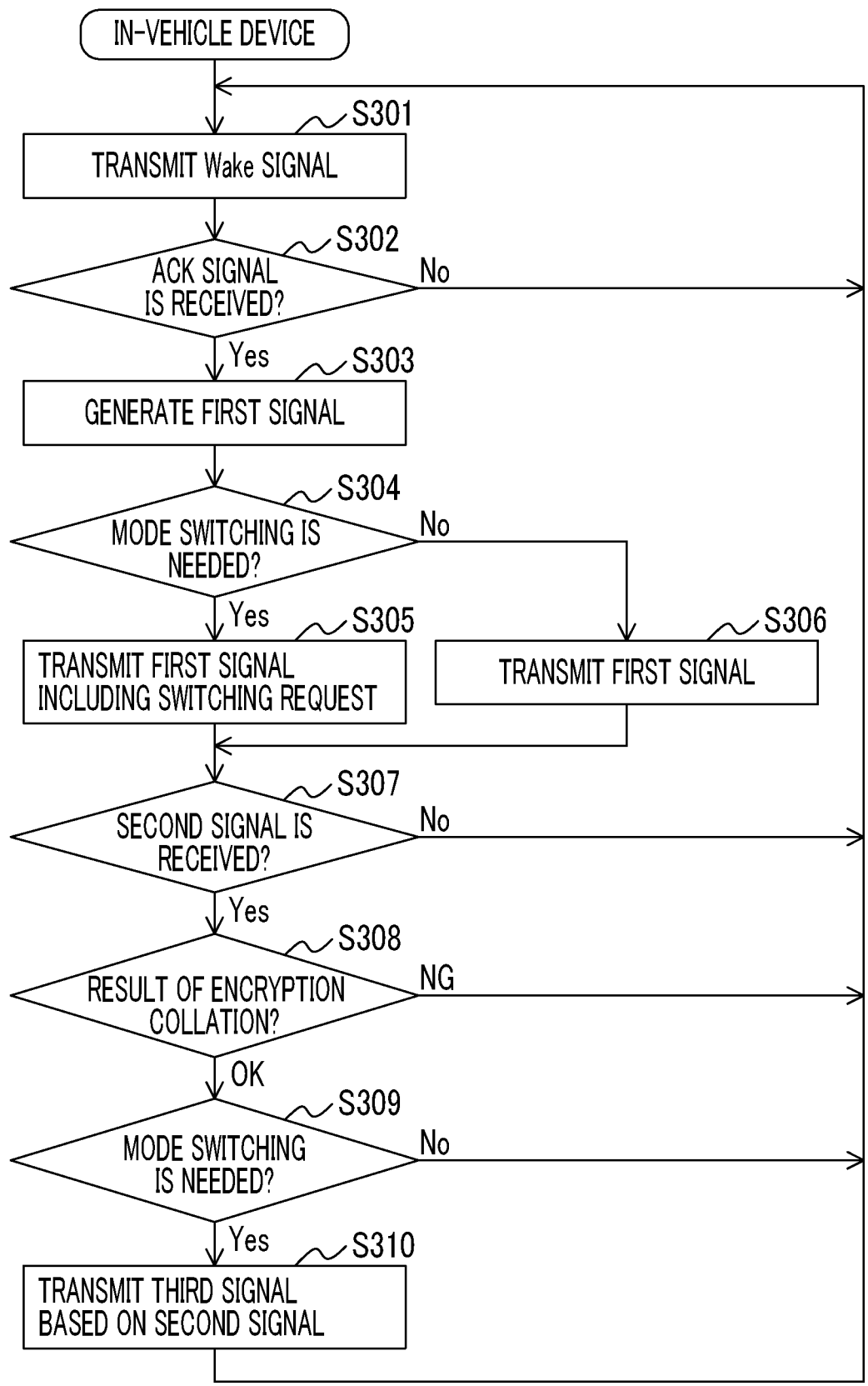
FIG. 3 is a flowchart illustrating a procedure of processing that the in-vehicle device executes.
Figure 4:
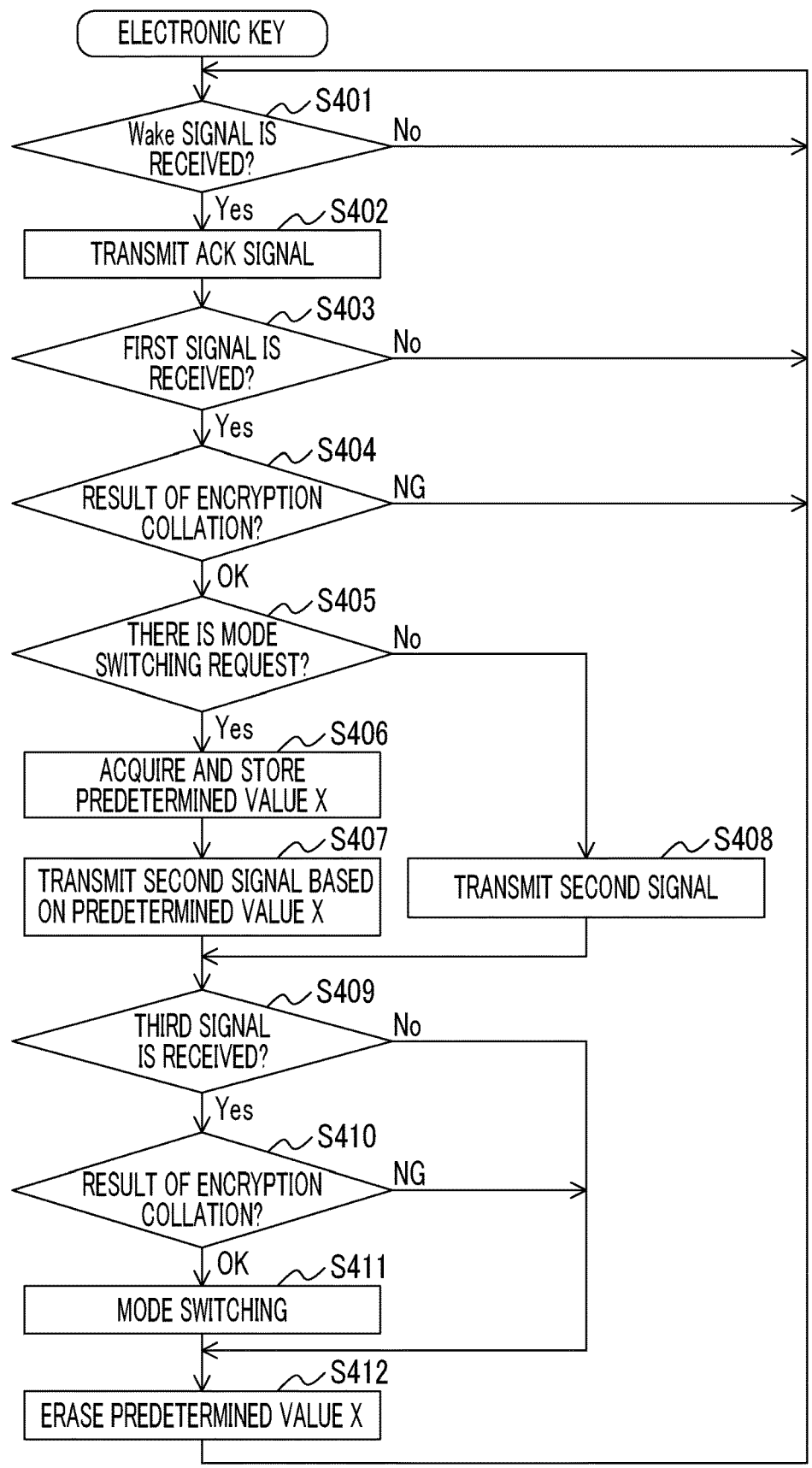
FIG. 4 is a flowchart illustrating a procedure of processing that the terminal executes.

FIG. 2 illustrates a state in which the vehicle control system 1 according to the embodiment performs a predetermined communication sequence between the in-vehicle device 10 and the electronic key 20, and the operation mode of the electronic key 20 is switched. FIG. 3 is a flowchart illustrating a procedure of processing that the in-vehicle device 10 executes. FIG. 4 is a flowchart illustrating a procedure of processing that the electronic key 20 executes.

In-Vehicle Device

First, FIG. 3 will be described. Processing shown in FIG. 3 is repeatedly performed by the in-vehicle device 10.

Step S301: The Wake signal for activating the electronic key 20 is transmitted at a predetermined timing (Processing [1] of FIG. 2). In a case where the Wake signal is transmitted, the process progresses to Step S302.

Step S302: Determination is made whether or not the ACK signal as a response to the Wake signal is received from the electronic key 20. Specifically, determination is made whether or not the ACK signal is received until a predetermined time elapses after the Wake signal is transmitted in Step S301. In a case where the ACK signal is received (S302, Yes), the process progresses to Step S303. In a case where the ACK signal is not received (S302, No), the process returns to Step S301.

Step S303: The first signal that is used in encryption collation for confirming whether or not the electronic key 20 that returns the ACK signal is an authorized electronic key is generated. In a case where the first signal is generated, the process progresses to Step S304.

Step S304: Determination is made whether or not there is a need to switch the operation mode of the electronic key 20 that returns the ACK signal. Whether or not there is a need to switch the operation mode of the electronic key 20 will be described below. In a case where there is a need to switch the operation mode of the electronic key 20 (S304, Yes), the process progresses to Step S305. In a case where there is no need to switch the operation mode of the electronic key 20 (S304, No), the process progresses to Step S306.

Step S305: The switching request of the operation mode of the electronic key 20 is included in the first signal generated in Step S303, and the first signal is transmitted to the electronic key 20 (Processing [3] of FIG. 2). In a case where the first signal is transmitted, the process progresses to Step S307.

Step S306: The first signal generated in Step S303 is transmitted to the electronic key 20 (Processing [3] of FIG. 2). In a case where the first signal is transmitted, the process progresses to Step S307.

Step S307: Determination is made whether or not the second signal as a response to the first signal is received from the electronic key 20. Specifically, determination is made whether or not the second signal is received until a predetermined time elapses after the first signal is transmitted in Step S305 or S306. In a case where the second signal is received (S307, Yes), the process progresses to Step S308. In a case where the second signal is not received (S307, No), the process returns to Step S301.

Step S308: Encryption collation of the second signal is performed and a collation result is determined. Specifically, determination is made whether or not the second signal is a response from the authorized electronic key 20. In a case where the result of encryption collation is OK (S308, OK), the process progresses to Step S309. In a case where the result of encryption collation is NG (S308, NG), the process returns to Step S301.

Step S309: Determination is made whether or not there is a need to switch the operation mode of the electronic key 20 where the result of encryption collation is OK. In a case where there is a need to switch the operation mode of the electronic key 20 (S309, Yes), the process progresses to Step S310. In a case where there is no need to switch the operation mode of the electronic key 20 (S309, No), the process returns to Step S301.

Step S310: The third signal for use in encryption collation is generated based on the second signal and is transmitted to the electronic key 20 (Processing [5] of FIG. 2). Specifically, a signal including a command for switching the operation mode of the electronic key 20 is generated as the third signal based on the predetermined value X used in generating the second signal. In a case where the third signal is transmitted, the process returns to Step S301.

Electronic Key

FIG. 4 will be described. Processing shown in FIG. 4 is repeatedly performed by the electronic key 20.

Step S401: Determination is made whether or not the Wake signal is received from the in-vehicle device 10. In a case where the Wake signal is received (S401, Yes), the process progresses to Step S402. In a case where the Wake signal is not received (S401, No), the process returns to Step S401.

Step S402: In order to notify that the electronic key 20 is activated according to the Wake signal, the ACK signal is transmitted to the in-vehicle device 10 (Processing [2] of FIG. 2). In a case where the ACK signal is transmitted, the process progresses to Step S403.

Step S403: Determination is made whether or not the first signal is received from the in-vehicle device 10. In a case where the first signal is received (S302, Yes), the process progresses to Step S404. In a case where the first signal is not received (S302, No), the process returns to Step S401.

Step S404: Encryption collation of the first signal is performed and a collation result is determined. Specifically, determination is made whether or not the first signal is a signal transmitted to the electronic key 20. In a case where the result of encryption collation is OK (S404, OK), the process progresses to Step S405. In a case where the result of encryption collation is NG (S404, NG), the process returns to Step S401.

Step S405: Determination is made whether or not a request for switching the operation mode of the electronic key 20 is included in the first signal. In a case where the request for switching the operation mode of the electronic key 20 is included (S405, Yes), the process progresses to Step S406. In a case where the request for switching the operation mode of the electronic key 20 is not included (S405, No), the process progresses to Step S407.

Step S406: The predetermined value X is acquired and stored in a predetermined storage unit. In a case where the predetermined value X is acquired and stored in the predetermined storage unit, the process progresses to Step S407.

Step S407: The second signal as a response to the first signal is generated based on the predetermined value X, and the second signal based on the predetermined value X is transmitted to the in-vehicle device 10 (Processing [4] of FIG. 2). In a case where the second signal is transmitted, the process progresses to Step S409.

Step S408: An original response signal is transmitted to the in-vehicle device 10 as the second signal. In a case where the second signal is transmitted, the process progresses to Step S409.

Step S409: Determination is made whether or not the third signal as a response to the second signal is received from the in-vehicle device 10. Specifically, determination is made whether or not the third signal is received until a predetermined time elapses after the second signal is transmitted in Step S407 or S408. In a case where the third signal is received (S409, Yes), the process progresses to Step S410. In a case where the third signal is not received (S409, No), the process progresses to Step S412.

Step S410: Encryption collation of the third signal is performed and a collation result is determined. Specifically, encryption collation of the third signal is performed using the predetermined value X, and determination is made whether or not the third signal is an authorized signal including the predetermined value X transmitted from the in-vehicle device 10 according to the procedure of the communication sequence. In a case where the result of encryption collation is OK (S410, OK), the process progresses to Step S411. In a case where the result of encryption collation is NG (S410, NG), the process progresses to Step S412.

Step S411: Determination is made that the third signal is an authorized signal transmitted from the in-vehicle device 10, and the operation mode of the electronic key 20 is switched from the first mode to the second mode or from the second mode to the first mode (Processing [6] of FIG. 2). In a case where the operation mode of the electronic key 20 is switched, the process progresses to Step S412.

Step S412: The predetermined value X stored in the predetermined storage unit is erased. In a case where the predetermined value X is erased, the process returns to Step S401.

Specific Example of Mode Switching

In the embodiment, an example where the electronic key 20 switches the operation mode according to the command for instructing mode switching transmitted from the in-vehicle device 10 has been described. Here, a condition when the operation mode of the electronic key 20 is switched will be described referring to FIG. 5 in connection with a specific example.

FIG. 5 is an example of a state transition diagram of the electronic key 20 in the vehicle control system 1 according to the embodiment of the disclosure. In the specific example, the electronic key 20 has a first mode, a second mode, a third mode, a fourth mode, and a fifth mode as a switchable operation mode. The electronic key 20 further includes, for example, a vibration detection unit 26 that detects vibration of the electronic key 20, such as an acceleration sensor.

The first mode is a mode that is set based on getting-off determination in the in-vehicle device 10, and is, for example, an extra-vehicle cabin mode. In the first mode, in a case where vibration of the electronic key 20 is not detected by the vibration detection unit 26 for a predetermined first time N1, the operation mode of the electronic key 20 is switched from the first mode and the fifth mode, and state transition is made. In the first mode, in a case where getting-in determination is made in the in-vehicle device 10, the operation mode of the electronic key 20 is switched from the first mode to the second mode, and state transition is made.

The second mode is a mode that is set based on getting-in determination in the in-vehicle device 10, and is, for example, an intra-vehicle cabin mode. In the second mode, in a case where vibration of the electronic key 20 is not detected by the vibration detection unit 26 for a predetermined second time N2 or in a case where getting-off determination is made in the in-vehicle device 10, the operation mode of the electronic key 20 is switched from the second mode to the first mode, and state transition is made. In the former case, in the second mode, in a case where vibration of the electronic key 20 is not detected by the vibration detection unit 26 for the first time N1 besides the second time N2, the operation mode of the electronic key 20 is switched from the second mode to the first mode and the fifth mode in order. Accordingly, in the second mode, in a case where vibration of the electronic key 20 is not detected by the vibration detection unit 26 for a predetermined third time N3 (=the first time N1+the second time N2) longer than the first time N1, the operation mode of the electronic key 20 is switched from the second mode to the fifth mode (a dotted-line arrow of FIG. 5).

The third mode is a mode that is set based on a state of the vibration detection unit 26. For example, switching to the third mode is performed when an abnormality of the vibration detection unit 26 is detected in the first mode and the second mode. Release of the third mode is performed when detection is made that the vibration detection unit 26 returns to normal. The operation mode of the electronic key 20 that is switched when the vibration detection unit 26 returns to normal may be appropriately one of the first mode and the second mode. Accordingly, in the third mode, communication between the electronic key 20 and the in-vehicle device 10 is not restricted without regard to the result of vibration detection in the vibration detection unit 26.

The fourth mode is a mode that is set based on a predetermined operation. In the fourth mode, communication between the electronic key 20 and the in-vehicle device 10 is restricted compared to the first mode and the second mode. For example, switching to the fourth mode is performed with a special operation (first input operation) determined in advance, such as depression of a dedicated button, in the first mode and the second mode. Release of the fourth mode is performed with a switch operation (second input operation) determined in advance. The operation mode of the electronic key 20 that is switched by the switch operation may be appropriately one of the first mode and the second mode.

The third mode and the fourth mode may be switched to each other by the special operation (first input operation) or the switch operation (second input operation).

The fifth mode is a mode that is set based on the result of vibration detection in the vibration detection unit 26. In the fifth mode, communication between the electronic key 20 and the in-vehicle device 10 is restricted compared to the first mode and the second mode. A content of restriction in the fifth mode may be disabling reception of an electric wave signal from the in-vehicle device 10, disabling a response to an electric wave signal received from the in-vehicle device 10, or a combination thereof. In the fifth mode, vibration is detected by the vibration detection unit 26, or a switch operation (second input operation) determined in advance, such as depression of a door unlock button, is performed, whereby the operation mode of the electronic key 20 is switched from the fifth mode to the first mode, and state transition is made.

In the above-described state transition, after vibration of the electronic key 20 is not detected for the first time N1 in the first mode, switching to the fifth mode is performed. After vibration of the electronic key 20 is not detected for the third time N3 in the second mode, switching to the fifth mode is performed. Accordingly, it is possible to further suppress frequent switching of the operation mode of the electronic key 20 in a case where the presence or absence of vibration of the electronic key 20 is repeatedly detected in a period shorter than a predetermined time.

Functional Effects of Embodiment

As described above, with the vehicle control system 1 according to the embodiment of the disclosure, in a case where the first signal including the switching request of the operation mode is received from the in-vehicle device 10, the electronic key 20 generates the second signal based on the predetermined value X (the random number generated by the electronic key 20, the reception strength of the first signal, or the communication frequency between the electronic key 20 and the in-vehicle device 10) that is updated each time the first signal is received, and transmits the second signal to the in-vehicle device 10. The electronic key 20 switches the operation mode as long as the third signal including the command for instructing mode switching generated based on the latest predetermined value X can be received from the in-vehicle device 10 as a response of the transmitted second signal.

With the above-described control, even though the third signal including the command for instructing mode switching to be communicated between the in-vehicle device 10 and the electronic key 20 is copied by a third party, in a case where the third signal is used in an unauthorized manner when one communication sequence or more regarding communication between the in-vehicle device 10 and the electronic key 20 has elapsed after the third signal is copied, determination is made in the electronic key 20 that the third signal is not a response to the second signal generated based on the latest predetermined value X.

Accordingly, it is possible to further suppress switching of the operation mode of the electronic key 20 at a timing unintended by the user.

The disclosure is usable in a vehicle control system that an in-vehicle device and an electronic key perform communication to control a vehicle, or the like. In addition, the disclosure is not limited to the above-described embodiment, and various alterations may be made without departing from the spirit and scope of the disclosure described in the claims.

What is claimed is:

1. A terminal that performs communication with an in-vehicle device to control a vehicle, the terminal comprising:
a processor configured to:
receive a first signal including a switching request of an operation mode of the terminal from the in-vehicle device;
in response to receiving the first signal including the switching request of the operation mode of the terminal from the in-vehicle device, generate a value and generate a second signal based on the generated value;
transmit the second signal to the in-vehicle device;
after transmitting the second signal to the in-vehicle device, receive a third signal from the in-vehicle device;
determine whether the third signal is a signal sent by the in-vehicle device as a response to the second signal;
in response to determining that the third signal is a signal sent by the in-vehicle device as a response to the second signal, switch the operation mode of the terminal from a first mode to a second mode or from the second mode to the first mode;
detect vibration of the terminal;
in the first mode, restrict communication with the in-vehicle device in a case where vibration is not detected for a predetermined time; and
in the second mode, restrict communication with the in-vehicle device in a case where vibration is not detected for a time longer than the predetermined time.

2. The terminal according to claim 1, wherein the value is a random number that is generated by the terminal.

3. The terminal according to claim 1, wherein the value is reception strength of the first signal.

4. The terminal according to claim 1, wherein the value is a communication frequency between the terminal and the in-vehicle device.

5. The terminal according to claim 1, wherein the processor is configured to:
when the first mode or the second mode is executed, in a case where an abnormality occurs in the vibration detection, switch the operation mode of the terminal to a third mode as an operation mode where communication with the in-vehicle device is performed, regardless of a result of the vibration detection.

6. The terminal according to claim 5, wherein the processor is configured to:
when the operation mode of the terminal is the third mode:
i) in a case where the abnormality of the vibration detection is eliminated, switch the operation mode of the terminal to the first mode or the second mode; and
ii) in a case where a first input operation on the terminal is detected, switch the operation mode of the terminal to a fourth mode as an operation mode where communication with the in-vehicle device is restricted.

7. The terminal according to claim 6, wherein the processor is configured to:

when the fourth mode is executed, solely in a case where a second input operation on the terminal is detected, release the fourth mode.

8. The terminal according to claim 1, wherein the vibration of the terminal is detected using an acceleration sensor.

9. A vehicle control system comprising:
an in-vehicle device; and
a terminal, wherein:
the in-vehicle device includes a first processor configured to:
in a case of switching an operation mode of the terminal, transmit, to the terminal, a first signal including a switching request of the operation mode of the terminal;
receive a second signal as a response to the first signal from the terminal;
generate a third signal including a command for instructing switching of the operation mode of the terminal based on the second signal; and
transmit the third signal to the terminal; and
the terminal includes a second processor configured to:
receive the first signal from the in-vehicle device;
update a predetermined value with the reception of the first signal and generate the second signal based on the updated predetermined value;
transmit the second signal to the in-vehicle device;
receive the third signal from the in-vehicle device; and
in a case where the third signal is a response to the second signal, switch the operation mode of the terminal from a predetermined first mode to a predetermined second mode or from the predetermined second mode to the predetermined first mode; and
the in-vehicle device and the terminal perform communication to control a vehicle.

10. A terminal that performs communication with an in-vehicle device to control a vehicle, the terminal comprising:
a processor programmed to:
switch and control an operation mode of the terminal to at least a predetermined first mode or a predetermined second mode;
receive a first signal including a switching request of the operation mode of the terminal from the in-vehicle device;
update a predetermined value with the reception of the first signal and generate a second signal based on the updated predetermined value;
transmit the second signal to the in-vehicle device;
in a case where a third signal, which is received by the terminal and includes a command for instructing switching of the operation mode of the terminal, is a response to the second signal, switch the operation mode of the terminal from the predetermined first mode to the predetermined second mode or from the predetermined second mode to the predetermined first mode;
detect vibration of the terminal;
in the predetermined first mode, restrict communication with the in-vehicle device in a case where vibration is not detected for a predetermined time; and
in the predetermined second mode, restrict communication with the in-vehicle device in a case where vibration is not detected for a time longer than the predetermined time.

11. The terminal according to claim 10, wherein the processor is programmed to:
when the predetermined first mode or the predetermined second mode is executed, in a case where an abnormality occurs in vibration detection of the terminal, switch the operation mode of the terminal to a third mode as an operation mode where communication with the in-vehicle device is performed, regardless of a result of the vibration detection of the terminal.

12. The terminal according to claim 11, wherein the processor is programmed to:
when the operation mode of the terminal is the third mode:
i) in a case where the abnormality of the vibration detection is eliminated, switch the operation mode of the terminal to the first mode or the second mode; and
ii) in a case where a first input operation on the terminal is detected, switch the operation mode of the terminal to a fourth mode as an operation mode where communication with the in-vehicle device is restricted.

13. The terminal according to claim 12, wherein the processor is programmed to:
when the fourth mode is executed, solely in a case where a second input operation on the terminal is detected, release the fourth mode.

14. The terminal according to claim 10, wherein the vibration of the terminal is detected using an acceleration sensor.

* * * * *